(12) United States Patent
Vauchel

(10) Patent No.: US 8,627,644 B2
(45) Date of Patent: Jan. 14, 2014

(54) THRUST REVERSER FOR A JET ENGINE

(75) Inventor: Guy Bernard Vauchel, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 1137 days.

(21) Appl. No.: 12/531,581

(22) PCT Filed: Feb. 20, 2008

(86) PCT No.: PCT/FR2008/000219
§ 371 (c)(1), (2), (4) Date: Sep. 16, 2009

(87) PCT Pub. No.: WO2008/135644
PCT Pub. Date: Nov. 13, 2008

(65) Prior Publication Data
US 2010/0107599 A1 May 6, 2010

(30) Foreign Application Priority Data
Apr. 4, 2007 (FR) .................. 07 02445

(51) Int. Cl.
*F02K 1/72* (2006.01)
*F02K 1/60* (2006.01)

(52) U.S. Cl.
USPC ............. 60/226.2; 60/226.3; 60/230

(58) Field of Classification Search
USPC .......... 60/226.2, 226.3, 230; 244/110 B; 239/265.25
See application file for complete search history.

(56) References Cited

U.S. PATENT DOCUMENTS

| | | | | |
|---|---|---|---|---|
| 3,511,055 A | * | 5/1970 | Timms | 60/229 |
| 3,541,794 A | * | 11/1970 | Bollenbacher et al. | 60/226.2 |
| 4,037,809 A | * | 7/1977 | Legrand | 244/54 |
| 4,044,973 A | * | 8/1977 | Moorehead | 244/54 |
| 4,442,987 A | | 4/1984 | Legrand et al. | |
| 4,585,189 A | * | 4/1986 | Buxton | 244/54 |
| 4,683,717 A | * | 8/1987 | Naud | 60/226.1 |
| 4,793,134 A | * | 12/1988 | Coplin et al. | 60/226.1 |
| 4,920,744 A | * | 5/1990 | Garcia et al. | 60/226.1 |
| 6,170,253 B1 | * | 1/2001 | Newton | 60/226.2 |
| 6,340,135 B1 | | 1/2002 | Barton et al. | |
| 6,438,942 B2 | * | 8/2002 | Fournier et al. | 60/226.2 |

FOREIGN PATENT DOCUMENTS

| | | |
|---|---|---|
| EP | 0155887 | 9/1985 |
| EP | 0780562 | 6/1997 |
| FR | 2908109 | 5/2008 |
| GB | 2151995 | 7/1985 |

OTHER PUBLICATIONS

International Search Report PCT/FR2008/000219; Dated Oct. 27, 2008.

* cited by examiner

*Primary Examiner* — William H Rodriguez
*Assistant Examiner* — Carlos A Rivera
(74) *Attorney, Agent, or Firm* — Brinks Gilson & Lione

(57) ABSTRACT

The invention relates to a thrust reverser (9) for an aircraft nacelle (1), including: a front frame (11), a cowl (21) which can move between an operating position and an intermediate maintenance position downstream of the front frame (11), means (26) for moving the cowl (21) between closed and open positions, and an inner structure (23) which can move between an operating position and an intermediate maintenance position downstream of the front frame (11). In addition, the cowl (21) comprises two half-cowls (21*a*, 21*b*) and the inner structure (23) comprises two structure halves (23*a*, 23*b*), whereby said half-cowls (21*a*, 21*b*) and said inner structure halves (23*a*, 23*b*) can open outward when the cowl (21) and the inner structure (23) are in the intermediate maintenance position.

12 Claims, 6 Drawing Sheets

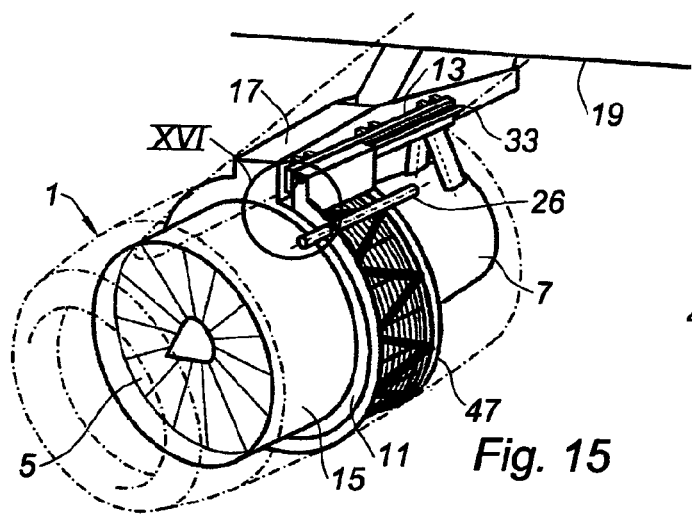 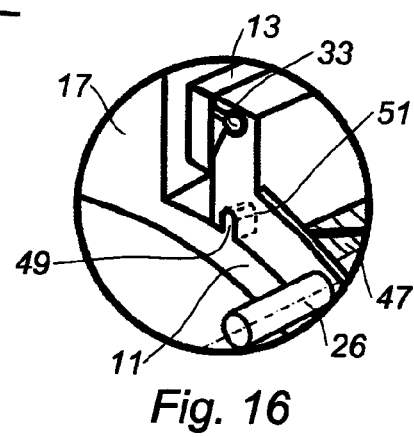
Fig. 15　　　Fig. 16
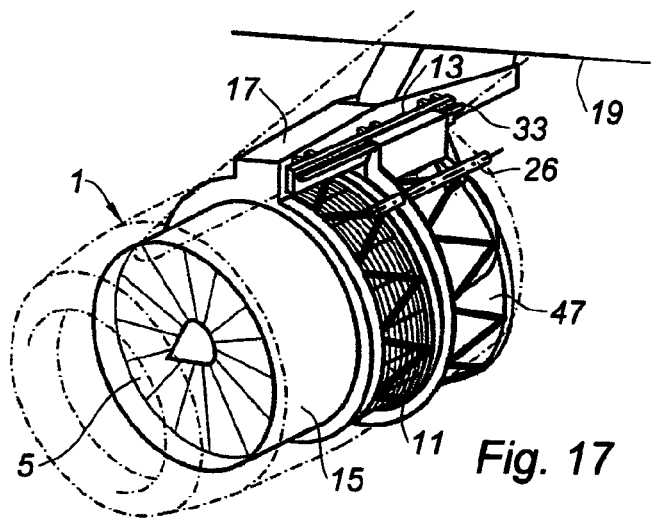 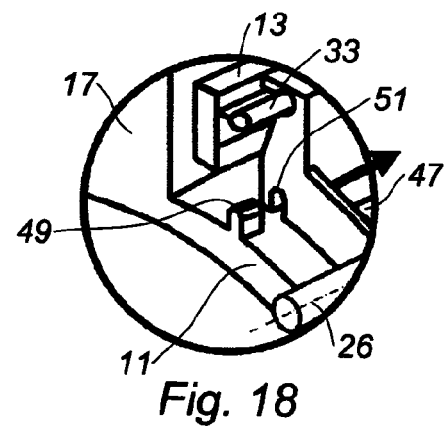
Fig. 17　　　Fig. 18
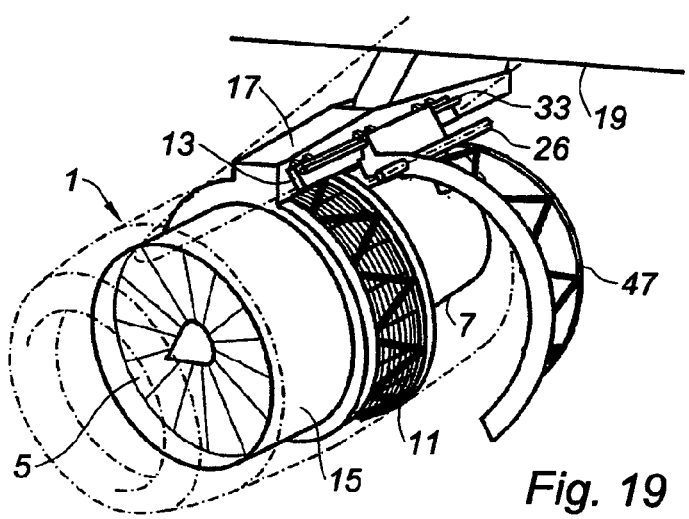
Fig. 19

THRUST REVERSER FOR A JET ENGINE

TECHNICAL FIELD OF THE INVENTION

The present invention relates to a thrust reverser for a jet engine.

BRIEF DESCRIPTION OF RELATED ART

An airplane is propelled by a number of turbojet engines each housed in a nacelle.

A nacelle generally has a tubular structure comprising an air intake upstream of the turbojet engine, a middle section intended to surround a fan of the turbojet engine, a downstream section incorporating thrust reversal means and intended to surround the combustion chamber of the turbojet engine, and generally ends in a jet pipe, the outlet of which is situated downstream of the turbojet engine.

Modern nacelles are intended to house a bypass turbojet engine capable of generating, on the one hand, a flow of hot air (also known as the primary flow) from the turbojet engine combustion chamber and, on the other hand, a flow of cold air (the secondary or bypass flow) from the fan and which flows around the outside of the turbojet engine through an annular passage, also known as a flowpath, formed between an internal structure that defines a cowling of the turbojet engine and an internal wall of the nacelle. The two air flows are ejected from the turbojet engine via the rear of the nacelle.

The role of a thrust reverser is, when an airplane is coming in to land, to improve the braking capability thereof by redirecting forward at least some of the thrust generated by the turbojet engine. In this phase, the reverser obstructs the flowpath of the cold flow and directs the latter toward the front of the nacelle, thereby generating a reverse thrust which adds to the braking of the wheels of the airplane.

The means employed to achieve this reorientation of the cold flow vary according to the type of reverser.

A thrust reverser for an airplane nacelle, comprising:
a front frame able to be mounted downstream of the fan casing of a bypass turbojet engine housed in said nacelle,
a cowl mounted such that it can move between a closed position in which it covers said front frame, an open position in which it uncovers said front frame and a maintenance position in which it is situated downstream of said front frame,
means for moving said cowl between said closed and open positions, and
an internal structure able to move between an operating position in which it is partially covered by said front frame and is itself able to cover part of said turbojet engine and to define an annular cold air flowpath with said cowl, and a maintenance position situated downstream of said front frame,
is particularly known from the prior art.

In a prior art thrust reverser such as this, access to the turbojet engine for maintenance operations is therefore obtained by moving the cowl and the internal structure toward the downstream end of the reverser (downstream with respect to the flow of air intended to flow through this reverser).

In practice, the movement of the cowl and of the internal structure in the downstream direction is limited, which means that it is not possible to access certain parts of the turbojet engine unless access hatches are provided in the internal structure.

BRIEF SUMMARY OF THE INVENTION

The invention provides a cascade thrust reverser of the aforementioned type that provides easier access to the turbojet engine.

More particularly, the invention provides a thrust reverser for an airplane nacelle, comprising:
a front frame able to be mounted downstream of the fan casing of a bypass turbojet engine housed in said nacelle,
a cowl mounted such that it can move between a closed position in which it covers said front frame, an open position in which it uncovers said front frame and an intermediate maintenance position in which it is situated downstream of said front frame,
means for moving said cowl between said closed and open positions,
an internal structure able to move between an operating position in which it is partially covered by said front frame and is itself able to cover part of said turbojet engine and to define an annular cold air flowpath with said cowl, and an intermediate maintenance position situated downstream of said front frame,
this reverser being notable in that said cowl comprises two half-cowls, and in that said internal structure comprises two internal half-structures, these half-cowls and these internal half-structures being able to open outward when said cowl and said internal structure are in the intermediate maintenance position.

Thus, for maintenance operations, the starting point is to move the cowl and the internal structure toward the downstream end of the reverser so as to uncover that part of the internal structure which is covered by the front frame with the cascades, then the half-cowls and the internal half-structures are opened outward.

This opening, which could not be hoped for in the thrust reverser of the prior art because of the partial overlap of the internal structure by the front frame, allows easy access to all of the components of the turbojet engine for maintenance operations.

According to other optional features of the reverser according to the invention:
said half-cowls are mounted such that they can slide between said closed and open positions, on first rails secured to said internal half-structures: these means of sliding are simple to implement and increase the mass of the reverser very little;
said internal half-structures comprise 12-o'clock islands able to make these internal half-structures open outward in combination with said half-cowls: this combined rotation allows each pair of half-cowls and of internal half-structures to be opened in a single operation;
said first rails are fixed to said islands: the cowl is thus moved into its open position by sliding this cowl with respect to these islands;
said internal half-structures are mounted such that they can slide between said operating and intermediate maintenance positions, on second rails themselves designed to be mounted such that they can pivot on a support pylon about axes substantially parallel to the direction in which these internal half-structures slide: it is these second rails that allow the half-structures to open outward;
this reverser further comprises two half-frames supporting said movement means and said half-cowls, these half-frames being able to move between an operating position in which they cover said front frame while allowing air from this front frame to pass, and an intermediate maintenance position in which these half-frames are situated downstream of said front frame and are able to open outward, these half-frames being mounted such that they can slide between said operating and intermediate maintenance positions on second rails themselves designed to be mounted such that they can pivot on a support pylon about axes substantially parallel to the direction in which these half-frames slide: thus, the movement means (generally jacks) move with the half-frames into the intermediate maintenance position, thus completely freeing access to the turbojet engine;

said reverser comprises means for affording sealing between said front frame and said two internal half-structures and, as appropriate, between said half-frames and said two internal half-structures: this makes it possible to prevent any ingress of water into the region where these components meet when the internal structure is in the operating position;

said second rails are mounted on beams, themselves designed to be mounted such that they can pivot on a support pylon about axes substantially parallel to the direction in which said internal half-structures or said half-frames slide: this embodiment makes it possible in a simple way and without significant added weight, to create a pivoting connection between the internal half-structures and the support pylon;

this reverser comprises locking means capable of preventing said half-cowls and said half-structures and, as appropriate, said half-frames, from moving from their operating positions toward their intermediate maintenance positions: this avoids any unwanted opening of these components;

said front frame is engineered to support said turbojet engine: this way of supporting the turbojet engine allows a satisfactory distribution of load (weight, thrust, reverse thrust) on the turbojet engine;

this reverser is of the cascade type, these cascades being mounted on said front frame;

this reverser is of the clamshell door type, these doors forming part of said cowl.

The present invention also relates to an airplane nacelle equipped with a thrust reverser in accordance with the foregoing.

BRIEF DESCRIPTION OF THE DRAWINGS

Other features and advantages of the present invention will become apparent in the light of the description which will follow and from studying the attached figures in which:

FIG. 15 is a view analogous to that of FIG. 1, for a second embodiment of the reverser according to the invention comprising two mobile half-frames, these half-frames being depicted in the operating position, FIG. 16 is a view of detail XVI of FIG. 15, FIG. 17 is analogous to FIG. 15, the two mobile half-frames being depicted in a maintenance position, FIG. 18 depicts detail XVI when the two moving half-frames move from their operating position to their intermediate maintenance position, FIG. 19 depicts the two moving frames (only one of them being visible in this figure) in the maintenance position, open outward.

DETAILED DESCRIPTION OF THE INVENTION

All of these figures depict the special case of a cascade-type thrust reverser, but the present invention also covers clamshell-door-type thrust reversers.

Figure 1:
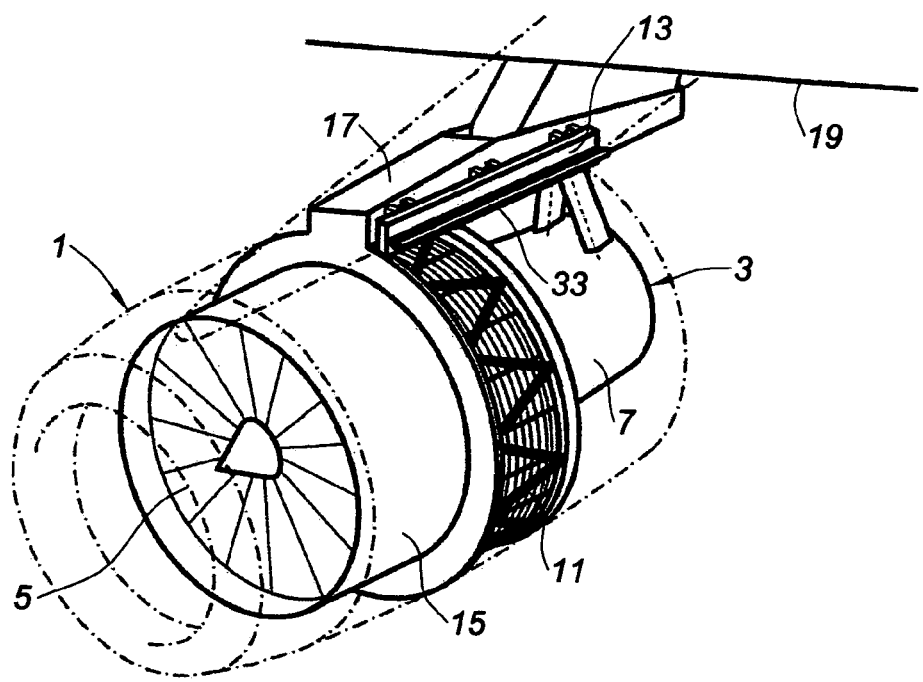
FIG. 1 is a perspective view of a motor assembly for an airplane, incorporating a reverser according to the invention, the cowl of which has been removed.

Reference is now made to FIG. 1 which shows that the motor assembly comprises a nacelle 1 enveloping a turbojet engine 3 comprising, on the one hand, a fan 5 and, on the other hand, an engine 7.

This motor assembly also comprises a thrust reverser 9 (see FIG. 2) of which only a front frame with cascades 11 and a pivoting beam 13 have been depicted in FIG. 1.

The front frame with cascades 11 is preferably fixed to the casing 15 of the fan 5.

This front frame with cascades 11 may possibly have a structural role, that is to say a function of connecting the turbojet engine 3 to a support pylon 17 intended to be fixed under the wing 19 of an airplane.

Figure 2:
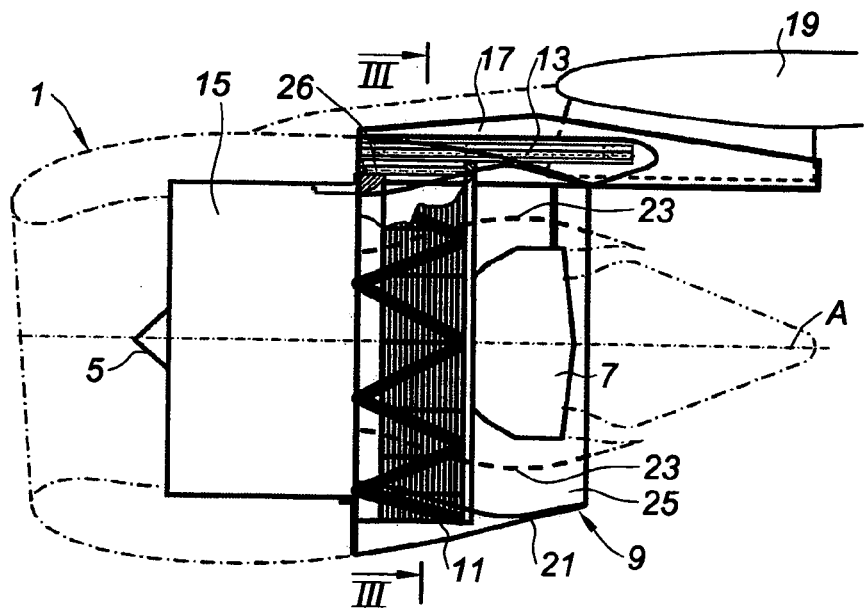
FIG. 2 is a side view of this motor assembly, the cowl of the reverser being depicted in the closed position.

Reference is more particularly made to FIG. 2 which depicts the reverser 9 according to the invention in the closed position.

Apart from the front frame with the cascade 11, this reverser 9 comprises a cowl 21 and an internal structure 23 able partially to cover the engine 7 of the turbojet engine 3 and to define an annular flowpath for cold air from the fan 5.

It will also be noted that actuating means such as jacks 26 are interposed between the front frame with cascades 11 and the cowl 21.

Figure 3:
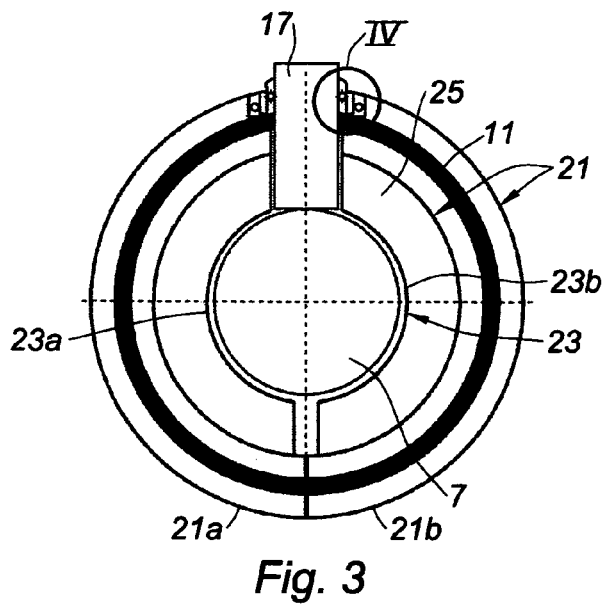
FIG. 3 is a view in section of the motor assembly of FIG. 2, the section being on of that figure.

FIG. 3 shows how the various components of the reverser are arranged relative to one another, and also shows the annular cold air flowpath 25.

As can also be seen in this figure, the cowl 21 in fact comprises two half-cowls 21a and 21b and the internal structure 23 comprises two internal half-structures 23a, 23b.

Figure 4:
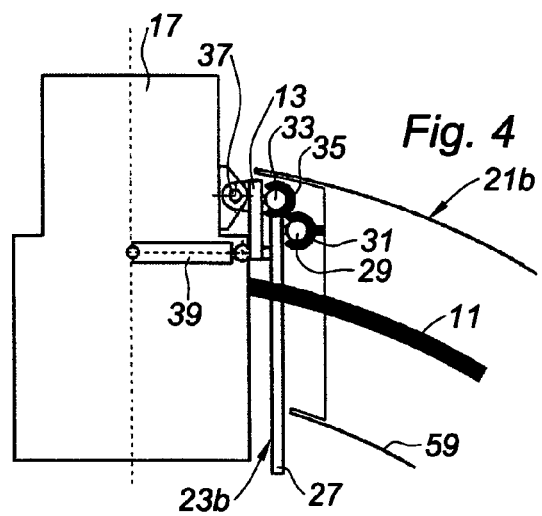
FIG. 4 is a view of detail IV of FIG. 3.

As can be seen from FIG. 4, the cowl 21 is mounted such that it can slide on a substantially vertical part 27 of the internal half-structure 23b, termed a "12-o'clock island", with respect to a first rail 29 that collaborates with a first slide 31.

The 12-o'clock island 27 is itself mounted such that it can slide by means of a second rail 33 and of a second slide 35, on the beam 13.

This beam 13 is itself mounted such that it can pivot on the pylon 17, about an axis substantially parallel to the rails 29 and 33, that is to say substantially parallel to the axis A of the motor assembly.

There are at least two points 37 at which the beam 13 is articulated to the pylon 17.

It is also possible to provide means of assisting the pivoting of the beam 13, such as one or more jack(s) 39.

Of course it must be understood that the half-cowl 21a and the half-structure 23a are connected to one another and to the pylon 17 by means identical to those which have just been described.

Figure 5:
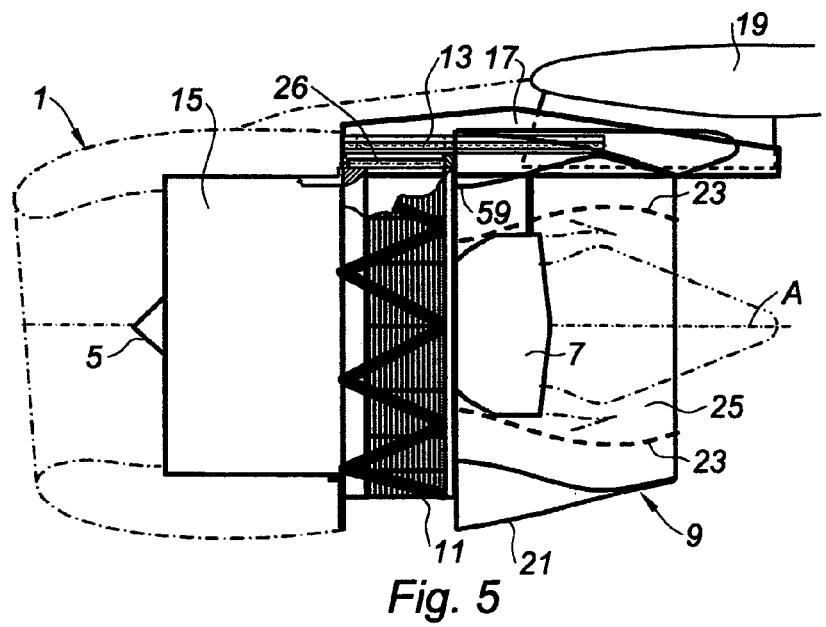
FIG. 5 is a view similar to that of FIG. 2, the reverser according to the invention being depicted in an intermediate maintenance position.

The intermediate maintenance position depicted in FIG. 5 is obtained by sliding the assembly formed by the cowl 21 and the internal structure 23 along the second rail 33, thus allowing this cowl and this internal structure to be brought downstream of the front frame with cascades 11.

Figure 6:
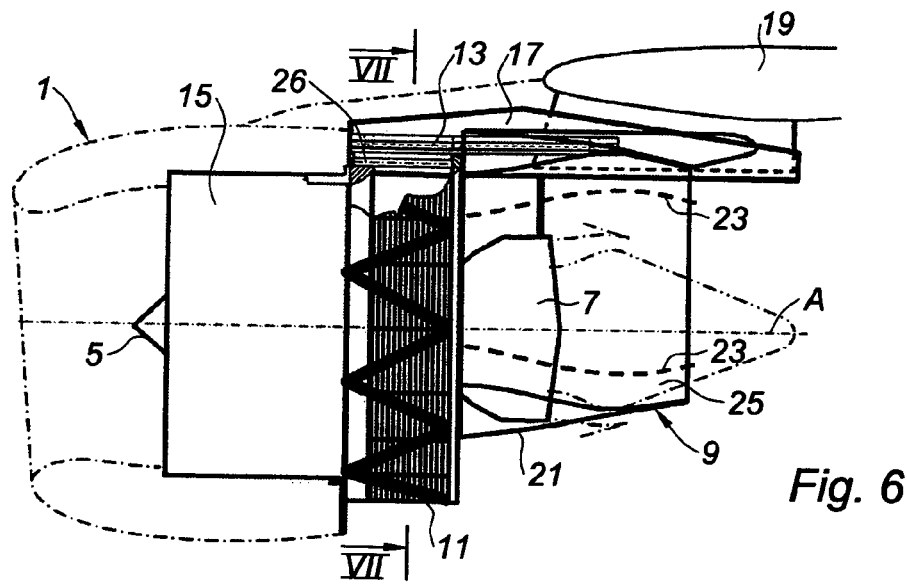
FIG. 6 is a view similar to FIGS. 2 and 5, the reverser according to the invention being depicted in an open maintenance position.
Figure 7:
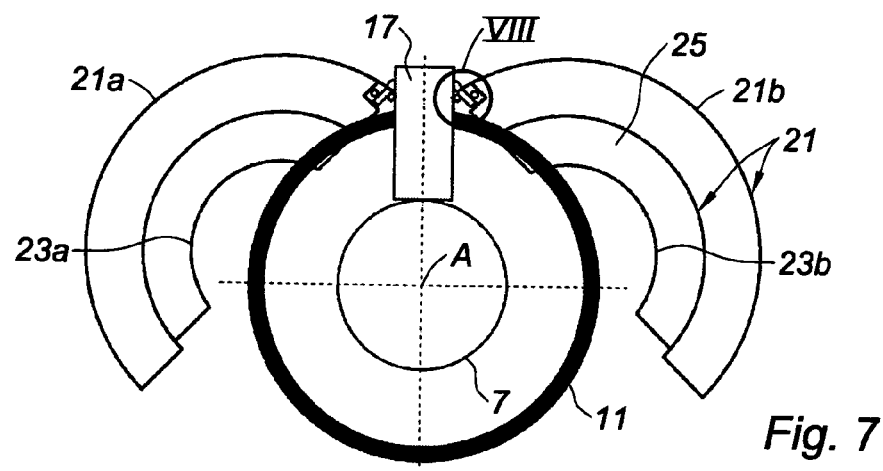
FIG. 7 is a view in section of the motor assembly of FIG. 6, the section being on VII-VII of that figure.
Figure 8:
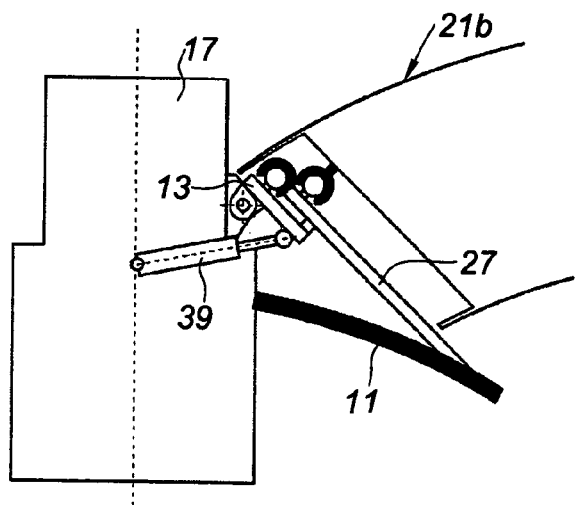
FIG. 8 is a view of detail VIII of FIG. 7.

As can be seen in FIGS. 6 to 8, the open maintenance position is then obtained by causing the beams 13, and therefore each half-assembly of an associated half-cowl and associated internal half-structure, 21a, 23a on the one hand, and 21b, 23b, on the other hand, to pivot outward.

As is particularly visible in FIG. 7, this outward pivoting of these half-assemblies thus provides very easy access to the engine 7.

It must be noted that the first rail 29 and the first slide 31 allow the cowl 21 to slide with respect to the internal structure 23 in the context of the reverser operating in a conventional mode.

Figure 9:
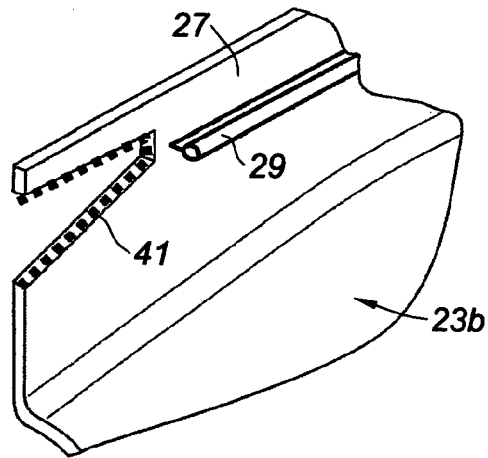
FIG. 9 is a perspective depiction of part of a 12-o'clock island of one of the internal half-structures of the reverser of FIGS. 1 to 8.
Figure 10:
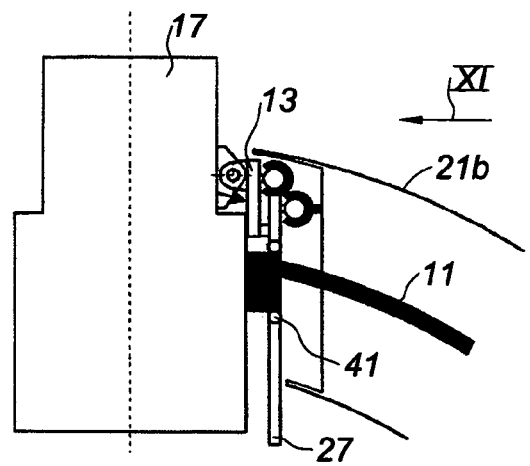
FIG. 10 is a view analogous to FIG. 4, taken in the region of collaboration between said island and the front frame with cascades of the reverser according to the invention when this reverser is in the operating position.
Figure 11:
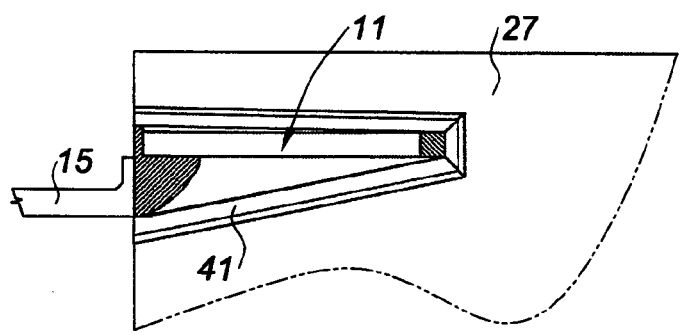
FIG. 11 is a side view of this region, that is to say a view in the direction of arrow XI of FIG. 10.

In FIGS. 9 to 11, it may be seen that it is advantageous to provide a seal 41, for example a silicone seal, in the region of each 12-o'clock island 27 intended to fit over the front frame with cascades 11 when the internal structure 23 is in the operating position.

As can be seen in FIG. 9, in this first embodiment, said region of collaboration is substantially in the form of a cutout.

Figure 12:
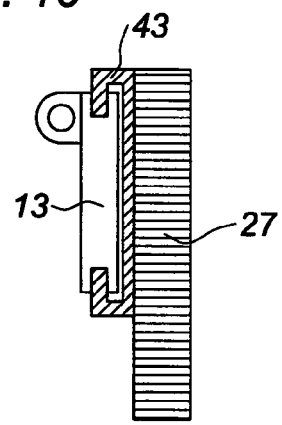
FIG. 12 depicts an alternative form of the means of connection between a 12-o'clock island of the internal structure of the reverser according to the invention and a beam mounted such that it can pivot on a support pylon.

FIG. 12 depicts an alternative form of the means of connection between the 12-o'clock island 27 and the beam 13: in this alternative form, a C-shaped intermediate piece 43 is interposed between the 12-o'clock island 27 and the beam 13.

This piece 43 therefore in fact produces a double slide connection on the upper and lower parts of the beam 13.

Figure 13:
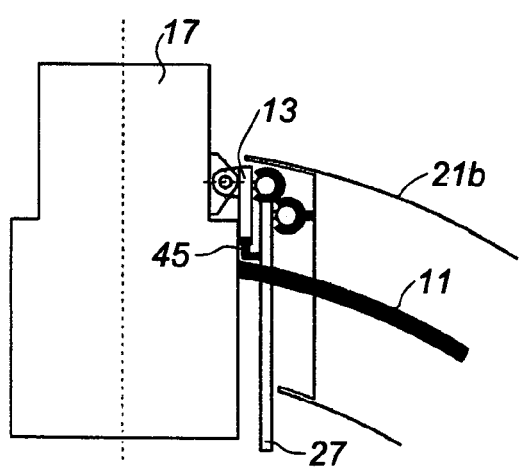
FIGS. 13 and 14 are views analogous to FIGS. 4 and 8 of alternative forms of embodiment of the way of connecting a 12-o'clock island to a pivoting beam.
Figure 14:
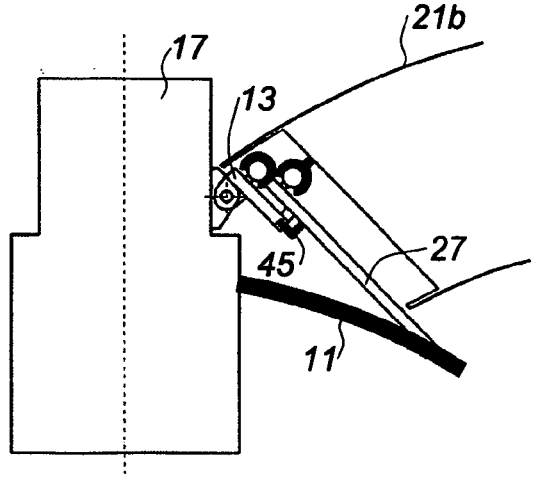

In the alternative form depicted in FIGS. 13 and 14, a finger 45 has been provided which collaborates with the beam 13 only onward of the moment when the internal structure 23 reaches the intermediate maintenance position.

Reference is now made to FIG. 15 which depicts a second embodiment according to the invention.

This embodiment differs from the preceding one in that the two half-cowls 21a, 21b, which are not depicted in FIG. 15, are mounted on a respective one of two moving half-frames, just one of them, bearing the reference 47, being visible in FIG. 15: these two half-frames are positioned on each side of the pylon 17.

In this case, the jacks 26 that actuate the two half-cowls 21a, 21b between a closed position in which they cover the two half-frames 47 and an open position in which they are situated downstream of these two half-frames, are mounted on these half-frames 47.

These half-frames 47 are each mounted such that they can slide on an assembly composed of a beam 13 and of a second rail 33 which are analogous to those of the previous embodiment.

Furthermore, each half-cowl 21a, 21b is also mounted such that it can slide on the associated 12-o'clock island 27 by virtue of a system of first rail 29 and first slide 31 which are analogous to those of the previous embodiment.

It must be understood that the moving half-frames 47 are arranged in such a way that they can let air from the cascades of the front frame 11 pass when they are in the position of FIG. 15.

The intermediate maintenance position of FIG. 17 is derived from the position of FIG. 15 by sliding the half-frames 47 along the second rails 33, allowing the two half-cowls 21a, 21b and the two internal half-structures 23a, 23b to be brought into the same position as that depicted in FIG. 5 in respect of the previous embodiment.

The open maintenance position depicted in FIG. 19 is obtained by pivoting the two beams 13, and therefore the two half-frames 47 and the two half-cowls 21a, 21b and the two half-structures 23a, 23b, outward.

It will be noted that, during this pivoting, the jacks 26 are carried along with the two half-frames 47, thus completely opening up access to the engine 7.

As can be seen in FIGS. 16 and 18, it is advantageously possible to provide a peg 49 secured to the front frame 11 and able to collaborate with a complementary notch 51 formed in the corresponding half-frame 47, this peg and this notch being designed in such a way as to prevent the half-frame 47 from being opened outward when it is in the operating position (FIG. 16), and to allow this half-frame to be opened outward when it is downstream of this operating position, that is to say when it is in the intermediate maintenance position (see FIG. 18).

Figure 20:
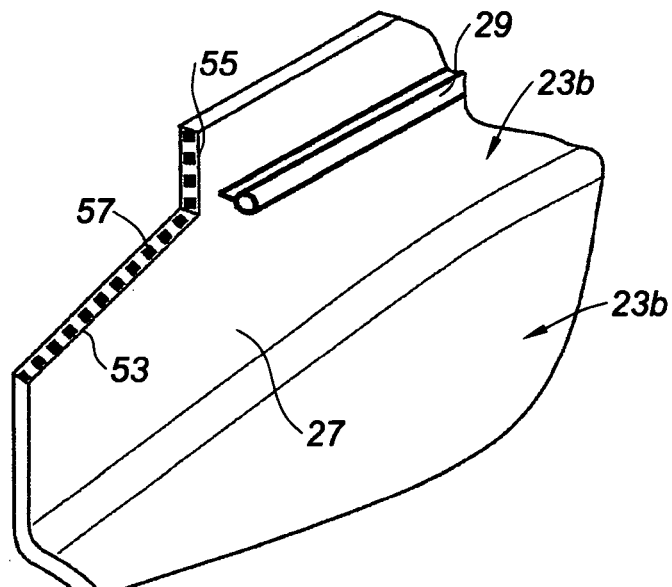
FIGS. 20 and 21 are analogous to FIGS. 9 and 11 respectively for this second embodiment.
Figure 21:
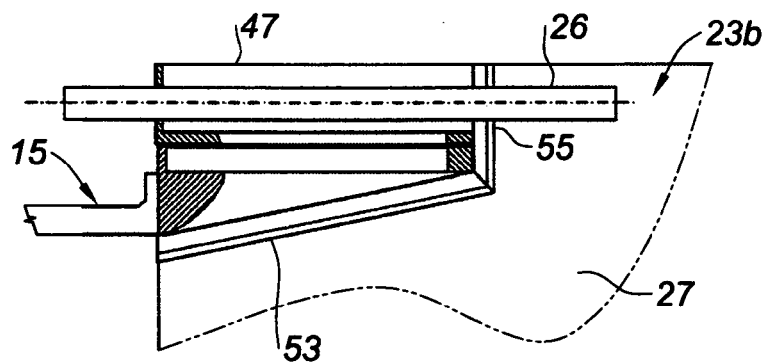
Figure 22:
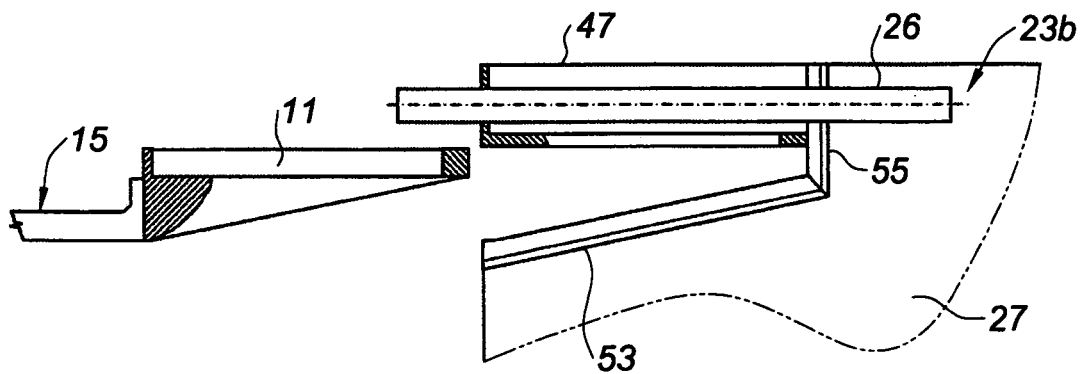
FIG. 22 is a view analogous to FIG. 21, the 12-o'clock island and the associated mobile half-frame being depicted in an intermediate maintenance position.

As can be seen in FIGS. 20 to 22, the region of each 12-o'clock island that is intended to collaborate with the front frame with cascades 11 and with a half-frame 47 has two edges 53, 55 on which a silicone seal 57 is fitted, making it possible to seal the connection between the 12-o'clock islands 27 of the internal structure 23 and the front frame 11 and half-frames 47, in the operating position depicted in FIG. 21.

In the intermediate maintenance position depicted in FIG. 22, the half-frames 47 and the associated half-structures 23 in combination slide downstream of the front frame 11.

The mode of operation and advantages of the reverser according to the invention follow directly from the foregoing description.

In the normal mode of operation, the thrust reverser 9 is in the position depicted in FIG. 2, that is to say the cowl 21 completely covers the front frame with cascades 11, thereby preventing any flow of air from the annular flowpath 25 from flowing through the cascades of this frame.

When the airplane comes in to land, the two half-cowls 21a, 21b are slid (see FIGS. 3 and 4) along the first rails 29 so these two half-cowls uncover the front frame with cascades 11.

This allows a flow of cold air from the flowpath 25 to pass through these cascades and thus exert a reverse thrust capable of contributing to the slowing of the airplane.

During this opening of the cowl 21, the internal structure 23 of course remains immobile about the engine 7.

Once slowing has been achieved, the cowl 21 returns to its closed position in which it covers the front frame with cascades 11, it being noted that these movements of opening and closing the cowl 21 are permitted by the jacks 26.

In the embodiment of FIG. 15 et seq., the open and close positions of the cowl 21 are instigated in a similar way to that which has been described, it being understood that when the cowl 21 is open, the flow of cold air from the annular flowpath 25 passes not only through the cascades of the front frame 11 but also through the half-frames 47.

When maintenance is to be carried out on the engine 7 of the turbojet engine 3, the starting point is to slide the assembly formed by the cowl 21 and the internal structure 23 downstream of the front frame with cascades 11 so as to bring this assembly into the intermediate maintenance position depicted in FIG. 5.

This allows the part of the internal structure 23 and the part of the internal skin 59 of the cowl 21, which are covered by the front frame with cascades 11, to be uncovered.

The next step is then to open each half-assembly of a half-cowl and of an internal half-structure 21a, 23a, on the one hand, and 21b, 23b, on the other hand, outward by virtue of the pivotings of the beams 13 with respect to the support pylon 17.

Thus it becomes possible to reach the position depicted in FIGS. 6 to 8, allowing excellent access to all the components of the engine 7.

In the embodiment depicted in FIG. 15 et seq., the half-frames 47 slide with the cowl 21 and the internal structure 23 toward the intermediate maintenance position depicted in FIG. 17, then pivot with this cowl and this internal structure outward toward the open maintenance position depicted in FIG. 19.

It will be noted that because the jacks 26 move in combination with the half-frames 47, access to the engine 7 of the turbojet engine 3 is completely unencumbered.

The sealing means depicted in FIGS. 9 to 11 on the one hand, and 20 to 22 on the other, allow sealed collaboration between the internal structure 23 and the front frame 11 (and possibly the half-frames 47) when the reverser is in the operating position: this then prevents any ingress particularly of water, toward the engine 7 of the turbojet engine 3.

It will be noted that the locking peg 49 depicted in FIGS. 16 and 18 makes it possible to avoid any unwanted opening of the half-frames 47 outward when these are in the operating position.

It will also be noted that the methods of connecting the 12-o'clock islands 27 to the beams 13 which have been depicted in FIGS. 12 to 14 allow a more firm interconnection of these elements ensuring better retention of the structure during rotation.

Of course, conventional means of locking the movements of the half-cowls 21a, 21b and of the half-structures 23a, 23b from their operating position to their intermediate maintenance position, on the one hand, and from their intermediate maintenance position to their open maintenance position, on the other hand, are advantageously provided.

This makes it possible to avoid any unwanted movement of the components liable to have serious consequences.

Of course, the present invention is not in any way limited to the embodiments described and depicted, which have been provided simply by way of illustrative examples.

As was already mentioned hereinabove, the present invention also covers the case of clamshell door thrust reversers: in such cases, the doors would be incorporated into the cowl 21 and the so-called closed and open positions of this cowl would respectively be the positions in which the doors are closed and the positions in which the doors are open, thus respectively covering or uncovering the front frame.

The invention claimed is:

1. A thrust reverser for an airplane nacelle comprising:
a front frame mounted downstream of a fan casing of a bypass turbojet engine housed in said nacelle, the front frame connecting the turbojet engine to a pylon;
a reverser of the cascade type, these cascades being mounted on said front frame;
a cowl mounted such that the cowl moves between a closed position in which the cowl covers said front frame, an open position in which the cowl uncovers said front frame and an intermediate maintenance position in which the cowl is situated downstream of said front frame;
means for moving said cowl between said closed and open positions; and
an internal structure able to move between an operating position in which the internal structure is partially covered by said front frame and is able to cover part of said turbojet engine and to define an annular cold air flowpath with said cowl, and the intermediate maintenance position situated downstream of said front frame,
wherein said cowl comprises two half-cowls, and said internal structure comprises two internal half-structures, these half-cowls and these internal half-structures being able to open outward when said cowl and said internal structure are in the intermediate maintenance position.

2. The reverser as claimed in claim 1, wherein said half-cowls are mounted such that they slide between said closed and open positions, on first rails secured to said internal half-structures.

3. The reverser as claimed in claim 1, wherein said internal half-structures comprise 12-o'clock islands able to make these internal half-structures open outward in combination with said half-cowls.

4. The reverser as claimed in claim 3, wherein first rails are fixed to said islands.

5. The reverser as claimed in claim 1, wherein said internal half-structures are mounted such that they slide between said operating and maintenance positions, on second rails themselves designed to be mounted such that they pivot on a support pylon about axes substantially parallel to the direction in which these internal half-structures slide.

6. The reverser as claimed in claim 1, further comprising two half-frames supporting said movement means for moving and said half-cowls, these half-frames being able to move between an operating position in which they cover said front frame while allowing air from this front frame to pass, and an intermediate maintenance position in which these half-frames are situated downstream of said front frame and are able to open outward, these half-frames being mounted such that they can slide between said operating and intermediate maintenance positions on second rails themselves designed to be mounted such that they pivot on a support pylon about axes substantially parallel to the direction in which these half-frames slide.

7. The reverser as claimed in claim 6, further comprising means for affording sealing between said half-frames and said internal half-structures.

8. The reverser as claimed in claim 1, further comprising means for affording sealing between said front frame and said two internal half-structures.

9. The reverser as claimed in claim 5, wherein said second rails are mounted on beams designed to be mounted such that they pivot on a support pylon about axes substantially parallel to a direction in which said internal half-structures or said half-frames slide.

10. The reverser as claimed in claim 6, further comprising locking pegs capable of preventing said half-cowls, said half-structures and, said half-frames from moving from their operating positions toward their maintenance positions.

11. The reverser as claimed in claim 1, wherein said front frame is engineered to support said turbojet engine.

12. An airplane nacelle, comprising a thrust reverser as claimed in claim 1.

* * * * *